US008923504B1

(12) United States Patent
Bracco et al.

(10) Patent No.: US 8,923,504 B1
(45) Date of Patent: Dec. 30, 2014

(54) SYSTEMS AND METHODS FOR REQUESTING A COMMUNICATION

(71) Applicant: The DIRECTV Group, Inc., El Segundo, CA (US)

(72) Inventors: Jacopo Bracco, New York, NY (US); Carlos R. Pontual, Rancho Palos Verdes, CA (US); Flover Sanchez, Cali, CO (US); Ricardo Montes Torre, Hawthorne, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/959,505

(22) Filed: Aug. 5, 2013

(51) Int. Cl.
 *H04M 3/00* (2006.01)
 *H04M 5/00* (2006.01)
 *H04M 3/51* (2006.01)

(52) U.S. Cl.
 CPC .................................. *H04M 3/5183* (2013.01)
 USPC .................. 379/265.12; 379/266.01; 379/309

(58) Field of Classification Search
 CPC . H04M 3/5231; H04M 3/5238; H04M 3/537; H04M 9/00; H04N 19/00; H04N 21/252; H04N 21/2541; H04N 21/40; H04N 21/4104; H04N 21/44222; H04N 21/4627; H04N 21/475; H04N 21/478; H04N 21/60
 USPC .......... 379/90.01, 93.01, 93.05, 93.07, 93.23, 379/93.24, 100.06, 100.08, 100.13, 100.14, 379/102.02, 102.03, 201.01, 204.01, 379/207.03, 207.04, 210.01, 265.09, 379/265.11, 265.14, 266.01, 266.03, 379/266.06, 309, 265.05, 265.1, 265.12
 See application file for complete search history.

(56) References Cited

U.S. PATENT DOCUMENTS

| 7,958,533 | B2 * | 6/2011 | Kikinis et al. ................. 725/100 |
| 2007/0274495 | A1 * | 11/2007 | Youd et al. ............... 379/210.01 |
| 2011/0145874 | A1 | 6/2011 | Bi et al. |
| 2012/0027184 | A1 * | 2/2012 | Vasquez et al. ............ 379/88.04 |
| 2013/0251139 | A1 * | 9/2013 | Williams et al. .......... 379/266.02 |

FOREIGN PATENT DOCUMENTS

| EP | 1868344 | A2 | 12/2007 |
| EP | 1940137 | A2 | 7/2008 |
| EP | 2536115 | A1 | 12/2012 |
| EP | 2608505 | A2 | 6/2013 |

OTHER PUBLICATIONS

International Search Report and Written Opinion dated Oct. 31, 2014 in International Application No. PCT/US2014/049473 filed Aug. 1, 2014 by Jacopo Bracco et al.

* cited by examiner

*Primary Examiner* — Binh Tieu

(57) ABSTRACT

Embodiments disclose systems and methods for requesting a communication. A method may include receiving, at a computing device, a first input that corresponds to a request for one or more phone numbers, wherein the request is associated with an account. In response to receiving the first input, the method may include the computing device selecting a phone number that is pre-associated with the account. The method may also include transmitting a call request from the computing device, wherein the call request indicates the selected phone number is to be called.

30 Claims, 9 Drawing Sheets

SYSTEMS AND METHODS FOR REQUESTING A COMMUNICATION

BACKGROUND

Customer service representatives (CSRs) play an important role in working with customers on a one-on-one basis to answer customer questions and address concerns. Companies often employ CSRs to work at company stores, but may also employ CSRs to be available via the phone to speak with customers. When the volume of calls to the company is great enough, the company may utilize a call center to receive and process the incoming calls.

Call centers include a number of CSRs that are available at given times to assist customers. Customers initiate a call to a call center by dialing a customer service number provided by a company. Once connected, the customer is presented with one or more menus or prompts that require the customer to enter information so that the customer can be routed to a CSR. The process of going through the menus can be time consuming. Moreover, once through the menus, the customer may still be asked to wait on the phone until a CSR is available. This process can be time consuming and tedious for the customer.

Efforts have been made to improve the customer's experience when interacting with CSRs at call centers by, for example, hiring additional CSRs and employing CSRs throughout the world so that customers can receive assistance at all hours of the day. Still other attempts have focused on allowing customers to bypass menus and be directly connected to an agent. For example, a customer could say a keyword or phrase, such as "agent" or "representative," or could press a certain sequence of buttons on the phone (e.g., "*", "0", "#"), which connect the customer to an agent. Embodiments described herein may help to reduce the amount of time that customers are required to wait on the phone until a CSR is available.

SUMMARY

Example embodiments may help to provide customers with a better customer service experience by allowing a customer to request that a CSR contact the customer rather than require that the customer wait on the phone until a CSR is available. The customer can specify a time at which a CSR should contact the customer, whether the CSR should contact the customer using an oral or written form of communication, or what issues the customer would like to discuss. Backend infrastructure may be used to route the customer's request to a CSR having training or experience that allows the CSR to assist the customer. In some cases, this routing may be based on a customer location, subscription type, or language. Once routed, the CSR may contact the customer, as requested, and assist the customer.

In particular, in one example, a method is disclosed that involves receiving, at a computing device, a first input that corresponds to a request for one or more phone numbers, wherein the request is associated with an account. In response to receiving the first input, the method may further involve the computing device selecting a phone number that is pre-associated with the account. The method may also involve transmitting a call request from the computing device, wherein the call request indicates the selected phone number is to be called.

In another example, a method is disclosed that involves receiving, by a server, a call request having call-request data. The method may also involve adding, by the server, the call request into a queue selected from among a plurality of queues based on the call-request data. The method may further involve determining, by the server, an availability of a device to process the call request in the selected queue and provide for a communication to occur in response to the availability of the device to process the call request in the selected queue.

In yet another example, a method is disclosed that involves receiving, by a server, a communication request having communication data to request a textual response. The method may further involve adding, by the server, the communication request into a queue selected from among a plurality of queues based on the communication data and provide for a written communication to occur in response to the communication request being delegated from the selected queue.

Also disclosed herein are structures configured to facilitate implementation of the disclosed methods. One embodiment may take the form of a computing device (e.g., a communication device, computing system, etcetera (etc.)) that includes a communication interface, a processor, data storage, and program instructions executable by the processor for carrying out the functions described herein. Another embodiment may take the form of a non-transitory computer-readable medium having instructions stored thereon for carrying out some or all of the functions described herein.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

Various embodiments are described herein with reference to the following drawings, in which like numerals denote like entities, and in which.

DETAILED DESCRIPTION

Figure 1:
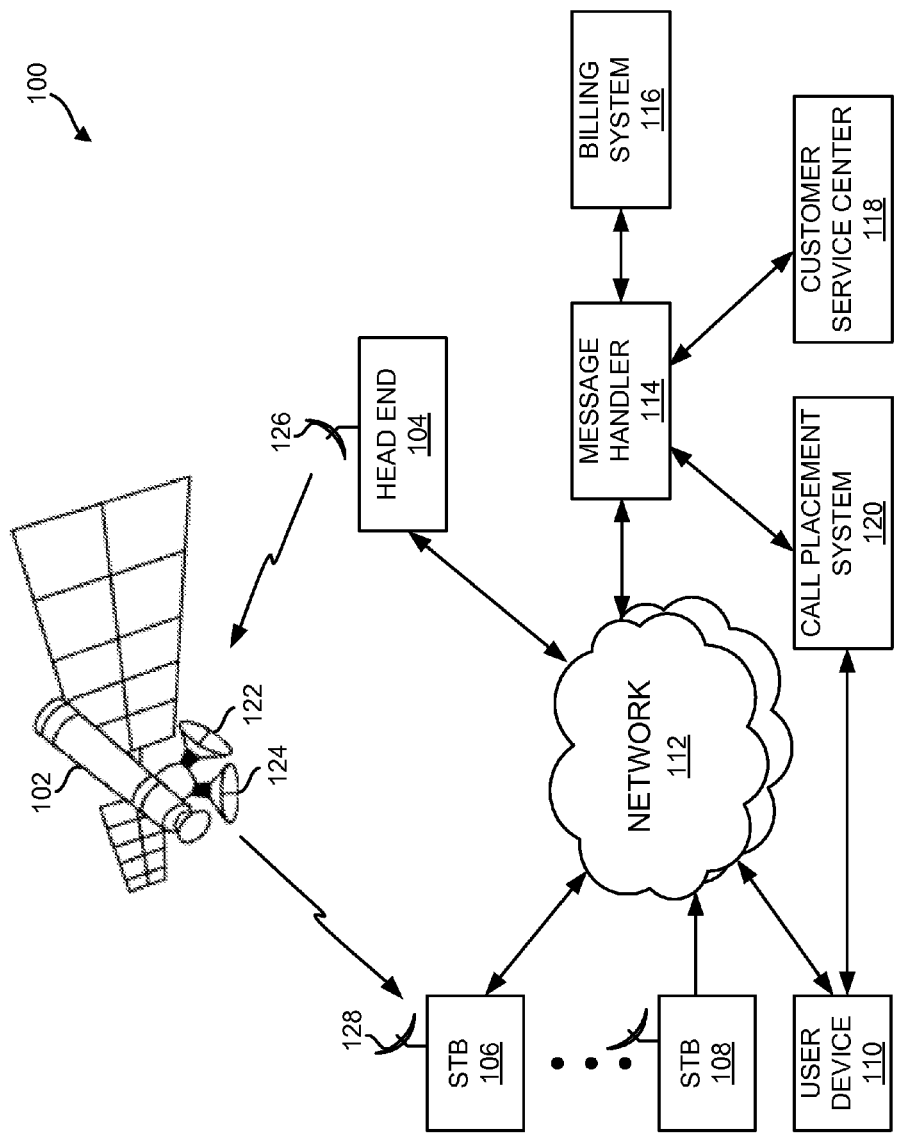
FIG. 1 is a simplified block diagram that illustrates a communication system in which embodiments of the disclosed methods and entities can be implemented.

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

Embodiments described herein help to provide or facilitate customer requests to have a CSR call the customer. For example, a customer may be interacting with a product or service, such as a set-top box that allows the customer to receive television signals or a service provided via the set-top box. While using such a set-top box, the customer may have a question or comment about the product or service. Rather than search for a customer call number, the customer may be presented with a software application with an interface that allows the customer to select one or more actions (e.g., via a menu or display portion). One such action may include the customer requesting assistance from a CSR.

The customer may request assistance from a CSR in a variety of ways. For instance, the customer may call a call center and request to speak with a CSR. In another instance, however, the customer may avoid having to call the call center, and instead choose for a CSR to contact the customer via a customer's user device. The process of having the CSR contact the customer may include the customer being presented (e.g., via a display connected to a set-top box) with one or more phone numbers associated with the customer's account. These phone numbers may include cellular phone numbers, landline numbers, work numbers, etc. The customer may select a phone number or enter a new phone number at which to receive a call or message. After a number is selected or entered, the customer may confirm that the customer would like a CSR to contact the customer at the selected or entered number. Further, the customer may be able to schedule the call to a time that may be more convenient for the customer.

Once a CSR call request is confirmed, the customer may receive a message or notification that a CSR will be contacting the customer at a given time. Embodiments may route the CSR call request and add the CSR call request to one or more queues based on a variety of factors that may be provided by the customer or determined based on data associated with the customer. For example, the customer's phone number may be associated with a location (such as a country) and one or more languages spoken in the country. Moreover, data associated with the customer may include a subscription level to indicate what type of plan the customer has purchased or any benefits that the subscription level may incur. Once the CSR call request is added to a queue, a CSR having expertise that match one or more of the factors used to queue the CSR call request may receive the CSR call request and call the customer. When the CSR calls the customer, the customer may choose to accept or decline the call. Further, in some examples, the customer may choose to reschedule the call to a time that may be more convenient for the customer. While a call request may be used to describe a type of communication request from the customer, it should be understood that examples using a call request may equally apply to other types of communication requests including instant message, chat, text, e-mail, video conferencing, etc.

I. Example Communication System

Referring now to the figures, FIG. 1 is a simplified block diagram that illustrates a communication system 100 in which embodiments of the disclosed methods and entities can be implemented. The communication system 100 may include a satellite 102, a head end 104, one or more set-top boxes 106, 108, one or more user devices 110, one or more networks 112, and one or more servers, such as a message handler server 114, a billing system server 116, a customer service center server 118, and a call placement system server 120. Other devices may also be included in the communication system 100. It should be understood that, although not illustrated, multiple satellites, head ends, servers, and other components might be included in the communication system 100. Moreover, while multiple components are illustrated separately, it should be understood that one or more of the components may be implemented as distributed components.

Satellite 102 may include one or more antennas 122, 124 configured to send and receive digital or analog signals to one or more devices in the communication system 100. For instance, satellite 102 may include a first antenna 122 configured to receive data via an uplink signal from a device, such as head end 104. Satellite 102 may also include a second antenna 124 that may transmit data via a downlink signal to a receiving device. The receiving device may be a mobile device or a stationary device. Set-top boxes 106, 108 or user device 110 may be a mobile device or a stationary device. In some examples, a single antenna may be used to receive data via an uplink signal and transmit data via a downlink signal. Other examples are also possible.

Head end 104 may include a transmitting antenna 126 for communicating data using one or more signals. For instance, transmitting antenna 126 may send signals to the antenna 122 at satellite 102. Satellite 102 may in turn send downlink signals to a receiving device, such as set-top box 106. In another instance, head end 104 may communicate data to set-top box 106 via a network 112. Network 112 may be representative of one or more types of networks, such as a public switched telephone network, the Internet, a mobile telephone network, or other type of network.

Set-top boxes 106, 108 are examples of receiving devices configured to receive data from satellite 102 or network 112. For example, set-top box 106 may include or be connected to an antenna 128 for receiving downlink signals from antenna 124. Set-top box 106 may also include one or more components structured and arranged to receive signals from network 112. The type, content, and number of signals received by set-top box 106 may vary. For instance, the signals may be media signals that may include video or audio signals. Data sent via the media signals may include content, program data, images, requests, or the like. Other examples are also possible.

In some examples, set-top boxes 106, 108 may be interconnected with one or more devices in the communication system 100 via a local network (not illustrated). The local network, which may be a wired network or wireless network, may be used to interconnect set-top boxes 106, 108 within a household, multi-dwelling unit, or commercial building. The local network may also allow for multi-room viewing of content stored on a first set-top box (such as set-top box 106) and communicated to a second set-top box (such as set-top box 108) through the local network. The stored content can comprise content a set-top box 106 receives from antenna 128.

User device 110 may include a variety of stationary or mobile computing devices. For example, user device 110 may include a landline telephone, cellular telephone, smartphone, personal computer, laptop computer, tablet computer, personal digital assistant (PDA), portable media player, or other computing device now known or later developed. User device 110 may be configured to send or receive data in a variety of ways. For example, user device 110 may receive downlink signals from antenna 124. In another example, user device 110 may send or receive signals from network 112. In yet another example, user device 110 may send or receive signals from one or more devices in the communication system 100. For instance, user device 110 may send or receive signals from set-top boxes 106, 108 via network 112. Other examples are also possible.

Communication system 100 may also include one or more servers, such as a message handler server 114. Message handler server 114 may include an enterprise service bus (ESB), and be configured to receive data from one or more devices via network 112. For example, message handler server 114 may receive signals from set-top box 106 via network 112. In some instances, the signals may include one or more requests for information relating to a subscriber or a service available at set-top box 106. However, other instances are also possible. After the message handler server 114 receives data, the message handler server 114 may process or communicate the received data to one or more other servers or components in the communication system 100.

Message handler server 114 may communicate with billing system server 116. Billing system server 116 may include information that may be used for purposes of calculating, creating, and maintaining bills. For example, the information may include account information including a customer or subscriber identifier (ID), such as a name, login, or unique subscriber ID, associated with a subscriber. The account information may also include: (i) location data for the subscriber (e.g., a subscriber address, city, state, zip code, county, country, etc.), (ii) service area information (e.g., a geographical region where a service is available), (iii) phone number data (e.g., one or more phone numbers associated with the subscriber), (iv) language information (e.g., one or more spoken or written languages, such as English, Spanish, French, Chinese, etc., which may be used to communicate with the subscriber), (v) a subscription-level indicator, such as an indication that the customer has a basic, intermediate, or premium subscription, for instance, (vi) a start date or end date of the subscription, (vii) the duration of time (e.g., the number of years) that the subscriber has had a subscription, (viii) current balance data, or (ix) outstanding balance data, among other possibilities.

In some examples, billing system server 116 may receive one or more information requests from one or more servers and respond to the request by sending the requested information to the requesting or designated server. For instance, billing system server 116 may receive an information request for subscriber phone numbers from message handler server 114. Billing system server 116 may respond to the information request by sending the requested subscriber information to message handler server 114. Upon receipt, message handler server 114 may send the received phone number information to set-top box 106. Other examples are also possible.

Message handler server 114 may also communicate with customer service center server 118. Customer service center server 118 may comprise a server that is configured to distribute calls to one or more CSRs. Call distribution may be performed using any number of data structures, such as a queue, priority queue, bonded queue, double-ended queue, or other data structure that allows data to be organized.

In some examples, message handler server 114 may receive a call request from set-top box 106 and send the call request to customer service center server 118, which may receive the call request and identify a queue in which to place the call request. Customer service center server 118 may use customer information to identify that the call request is associated with a subscriber in a specific location, a subscriber that speaks a certain language, or a subscriber with a specific question or comment. Based at least in part on the identification, the customer service center server 118 may determine what queue to place the call request. In some instances, the customer service center server 118 may send the call request to another customer service center server (not illustrated) having one or more queues configured to queue the call request. Once through the queue, a call service representative may be notified that the customer would like to speak with a call service representative.

Call placement system server 120 may connect a CSR to a customer by way of a customer's user device, such as user device 110. The process of connecting the CSR to a customer may vary. For example, once a call request goes through a queue in customer service center server 118, the customer service center server 118 may notify call placement system server 120 either directly or indirectly (e.g., via customer service center server 118) that a CSR is ready for a call. Call placement system server 120 may then initiate a call to the CSR that is ready for a call. The call placement system server 120 may also initiate a call to the customer's user device (e.g., user device 110) directly or indirectly (e.g., via network 112). The call to the customer's user device may be initiated after the CSR is connected to the call or while the call placement system server 120 is in the process of initiating the call to the CSR. In some examples, a call placed by the call placement system server 120 may occur using a landline, voice over Internet Protocol (VoIP), or some other mechanism.

The customer may receive (e.g., via user device 110) a call from the call placement system server 120 and may choose to accept or deny the call. Should the customer decline the call, the call may be ended. However, in some examples, when declining the call, the user may request that the CSR call the customer at a different time or at a different number. Should the customer accept the call, the call placement system server 120 may connect the customer with the customer representative. The customer may communicate with the CSR until the customer or the CSR terminates the call. This allows the customer to request a call, and subsequently receive a call from a CSR without having to call a CSR or wait on a telephone until a CSR is available to assist the customer.

II. Example Computing Device

Figure 2:
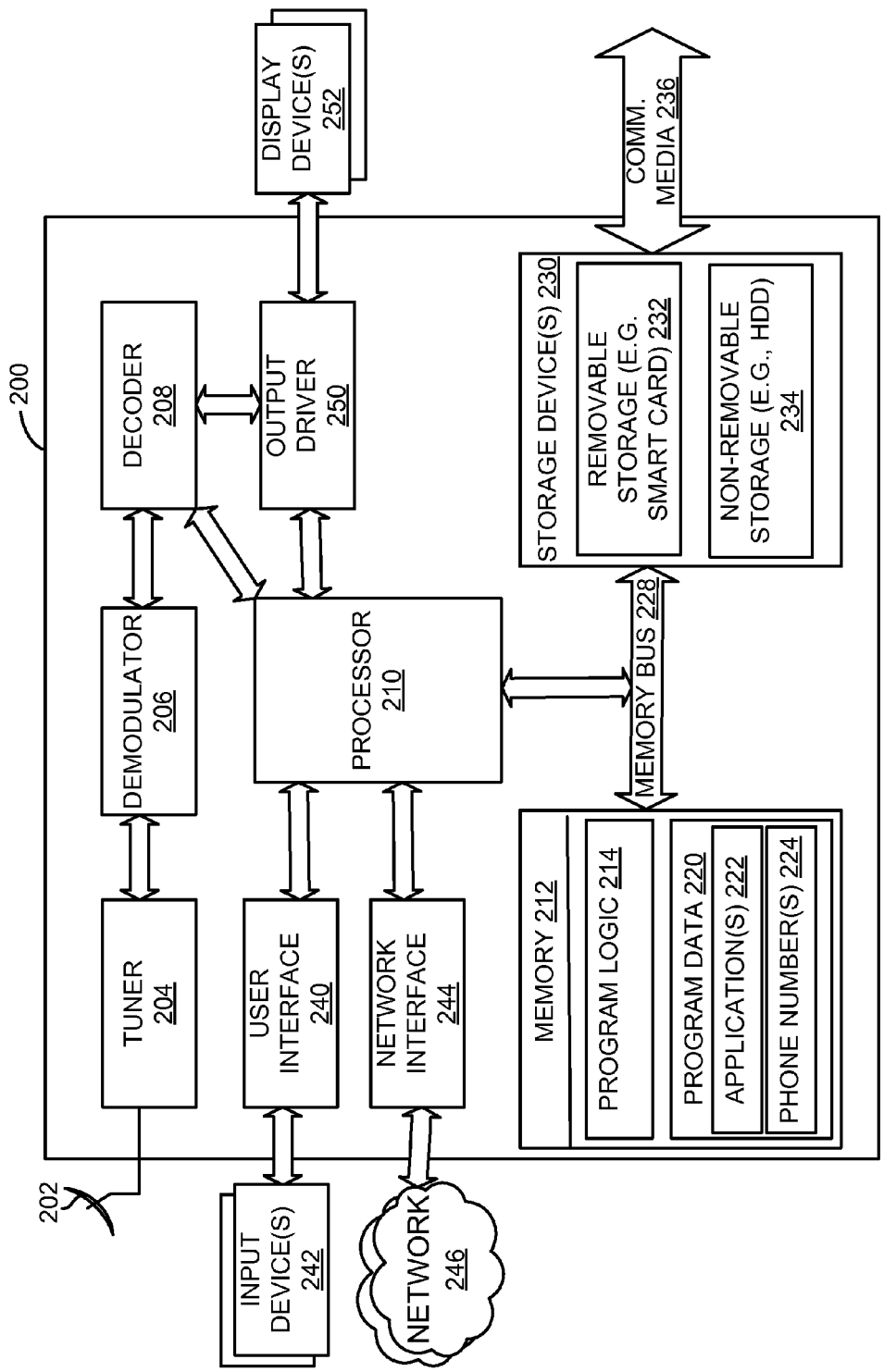
FIG. 2 is a functional block diagram that illustrates a computing device used in a communication system.

FIG. 2 is a functional block diagram that illustrates a computing device 200 used in a communication system in accordance with embodiments described herein. Computing device 200 may take a variety of forms. For example, computing device 200 may comprise or be arranged as a set-top box (such as set-top boxes 106, 108 of FIG. 1). The set-top box may be used for television or other media. As another example, computing device 200 may comprise or be arranged as a landline or cellular telephone, smartphone, personal computer, laptop computer, tablet computer, personal digital assistant (PDA), portable media player, or other computing device now known or later developed.

Computing device 200 may include an antenna 202, a tuner 204, a demodulator 206, a decoder 208, a processor 210, a memory 212, one or more storage devices 230, a user interface 240, a network interface 244, and an output driver 250. Although, a particular configuration of computing device 200 is illustrated, the configuration is merely representative of various possible receiving devices. For example, although only one tuner 204, one demodulator 206, and one decoder 208 are illustrated, multiple tuners, demodulators, or decoders may be provided within computing device 200. The components described in FIG. 2 may be communicatively linked by a system bus, network, or other connection mechanism.

Antenna 202 may be one of a number of different types of antennas that may include one or more low noise blocks downconverters (LNB) associated therewith. For instance, antenna 202 may be a single antenna for receiving signals from a satellite (such as satellite 102 of FIG. 1), network (such as network 112 of FIG. 1), or terrestrial source. In another instance, antenna 202 may include multiple antennas for different orbital slots. In yet another instance, signals and other items described as being received by antenna 202 can be received by network interface 244 by way of a coaxial cable or other communication link. In that regard, one or more signals or items received at network interface 244 can be forwarded to tuner 204.

Tuner 204 may receive a signal from antenna 202. The signal may be a media signal that may include video or audio signals. The signal may also include a television signal. The content of the signal may vary based on the type of signal. For example, the content may include television programming content, program guide data or other types of data. Tuner 204 may communicate the signal to demodulator 206.

Demodulator 206 may receive the signal and demodulate the signal to form a demodulated signal. Decoder 208 may decode the demodulated signal to form a decoded signal or decoded data. The decoded signal may be sent to processor 210 or output driver 250. However, other examples are also possible.

Processor 210 may be any type of processor, such as a microprocessor, a microcontroller, a digital signal processor (DSP), multicore processor, etc. Processor 210 may be used to coordinate or control tuner 204, demodulator 206, decoder 208, and any other components of computing device 200 that may or may not be illustrated in FIG. 2. In some implementations, processor 210 may include an internal memory controller (not illustrated). Yet other implementations may include a separate memory controller that can be used with processor 210.

A memory bus 228 can be used for communicating between the processor 210 and memory 212. Memory 212 may be any suitable type of memory. For example, memory 212 may include a non-transitory computer-readable medium, for example, such as computer-readable media that stores data for short periods of time like solid-state memory, flash drives, register memory, processor cache and Random Access Memory (RAM). The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium or a tangible storage device.

Memory 212 may include program logic 214 and program data 220. Program logic 214 may include programming instructions, such as computer executable or logic-implemented instructions. In some examples, the programming instructions may be provided or otherwise obtainable in a downloadable format, such as via network 246 (which may be illustrated as network 112 in FIG. 1). Program data 220 may include program information that can be directed to various data types. For instance, program data 220 may include one or more applications 222 that may execute one or more algorithms arranged to provide input components of computing device 200, in accordance with the present disclosure. Program data 220 may also include data (such as phone numbers 224 or customer account information) that may be stored in memory 212 at computing device 200.

In some implementations, memory 212 may be distributed between one or more locations. For example, at least a portion of memory 212 may reside within processor 210. In another example, all or part of memory 212 may reside on a storage device 230. Storage device 230 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

Computing device 200 may also include a user interface 240 that is configured to allow a customer to interact with computing device 200 via one or more input devices 242. Examples of input device 242 may include a remote control (or more simply, a remote), keyboard, a computer mouse, one or more push buttons, a touch screen, a smart phone, a tablet PC, a voice activated interface, or the like. Input device 242 may be used, for example, to select a channel, select information, change the volume, change the display appearance, or other functions using user interface 240. Input device 242 may also be used to select a phone number, a confirmation to request a call from a CSR, a time at which to schedule or reschedule a call, a cancelation of a call request, etc. The process of making a selection with input device 242 may take a variety of forms, such as an action by a customer.

Computing device 200 may include network interface 244 for communicating data through one or more networks 246. Network interface 244 may take a variety of forms. For example, network interface 244 may be a WiFi, WiMax, WiMax mobile, data over cable service interface specification (DOCSIS), wireless, cellular, or other types of interfaces. Moreover, network interface 244 may use a variety of protocols for communicating via the network 246. For instance, network interface 244 may communicate using Ethernet, a Transmission Control Protocol/Internet Protocol (TCP/IP), a hypertext transfer protocol (HTTP), or some other protocol.

Computing device 200 may be coupled to a display 252. Display 252 may be a television, monitor, or other device configured to display images. The images may be video, graphics, text, or any variety of other visual representations. In some examples, the display 252 may include an audio output, such as a loudspeaker, to generate sound waves from media signals received by display 252.

Display 252 may communicate with an output driver 250 within computing device 200 to facilitate communication between computing device 200 and display 252. In some implementations, output driver 250 may work in conjunction with a graphics processing unit (not illustrated), which can be configured to communicate with display device 252. Output driver 250 can communicate with display device 252 by a high-definition multiple interface (HDMI) cable, a coaxial cable, some other wired communication link, or wirelessly.

In some examples, computing device 200 may communicate directly or indirectly with one or more additional devices using a communication media 236. A communication connection is one example of a communication media 236. Communication media 236 may be embodied by computer-readable instructions, data structures, program modules, or other data in a modulated data signal, such as a carrier wave or other transport mechanism. The communication media 236 may also include wireless, optical, or other information delivery media. A modulated data signal can be a signal that has one or more of its characteristics set or changed in such a manner to encode information in the signal. By way of example, and not limitation, communication media 236 can include wired media such as a wired network or direct-wired connection, and wireless media such as acoustic, radio frequency (RF), infrared (IR) or other wireless media. The communication may include a cellular or cellular data connection, a satellite data connection, etc.

III. Example Server

Figure 3:
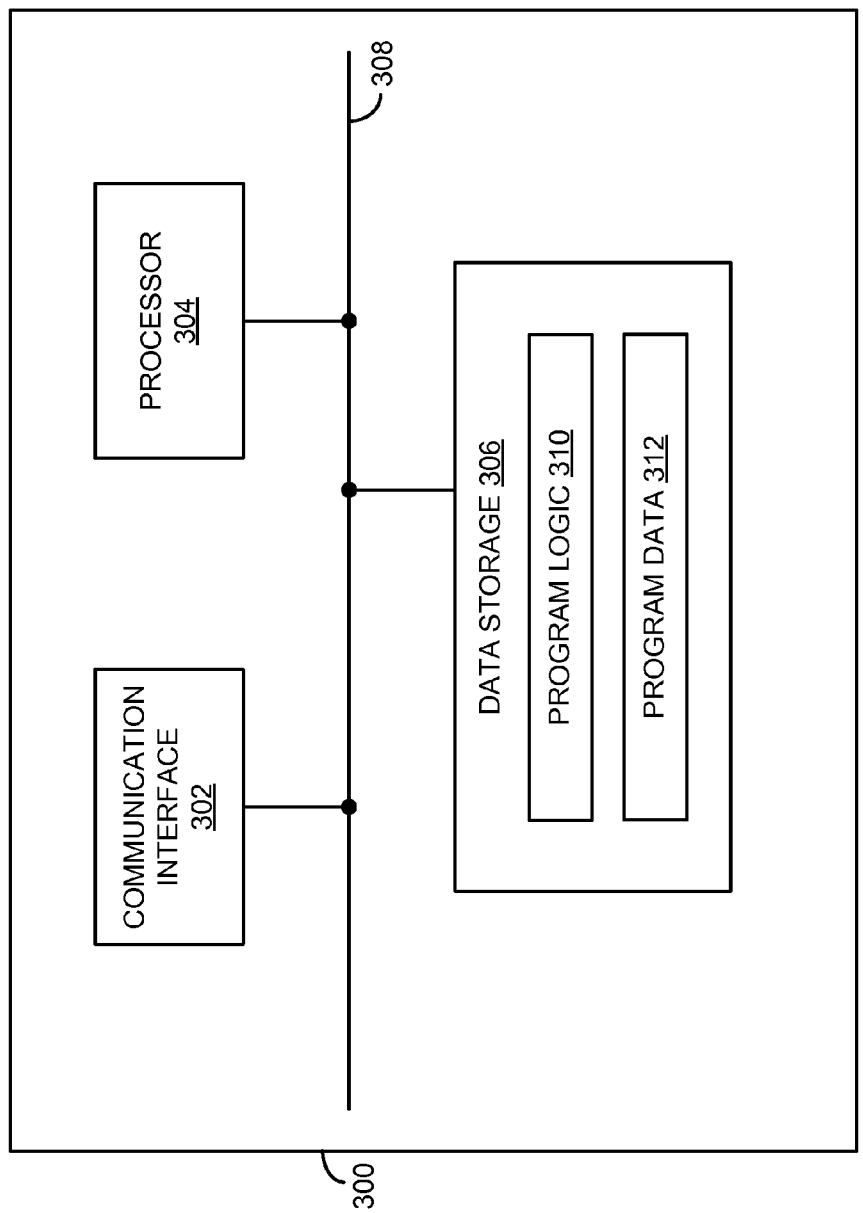
FIG. 3 is a functional block diagram that illustrates a server used in a communication system.

FIG. 3 is a functional block diagram that illustrates a server 300 used in a communication system in accordance with embodiments described herein. As shown, server 300 may include a communication interface 302, a processor 304, and a data storage 306, all of which may be communicatively linked together by a system bus, network, or one or more other connection mechanisms 308. Although not shown, server 300 may also include other components, such as external storage. It should also be understood that the configuration or functionality of server 300 may be distributed or subdivided between a plurality of entities, such as multiple servers. Further, it should be understood that some of the functions described herein may be carried out by an entity other than a server.

In server 300, the communication interface 302 may comprise one or more structures, and associated equipment, for receiving data from one or more sources and distributing data to a group of one or more destinations. For instance, communication interface 302 may be configured to receive a request from one or more entities (such as a set-top box) and add the request in a queue based on data associated with the request. The communication interface 302 may also be configured to provide for a communication to occur once the request is dequeued or otherwise processed.

Processor 304 may comprise one or more processors, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), or any other processor components now known or later developed. Processor 304 may be integrated in whole or in part with other components of server 300.

Data storage 306 may be a non-transitory computer-readable medium. For example, data storage 306 may take the form of one or more volatile or non-volatile storage components, such as magnetic, optical, or organic storage components, integrated in whole or in part with a processor 306. As further shown, data storage 306 may include program logic 310 or program data 312. Program logic 310 may include, for example, machine language instructions executable by processor 304 to carry out various functions, such as the functionality of the methods and systems described herein. Program data 312 may include one or more types of data deemed suitable for a given implementation. For example, program data 312 may include program information that can be directed to various data types (such as queues). Program data 312 may also include data (such as database tables relating to customer information) that may be stored in memory.

IV. End User Methods and Examples

Figure 4:
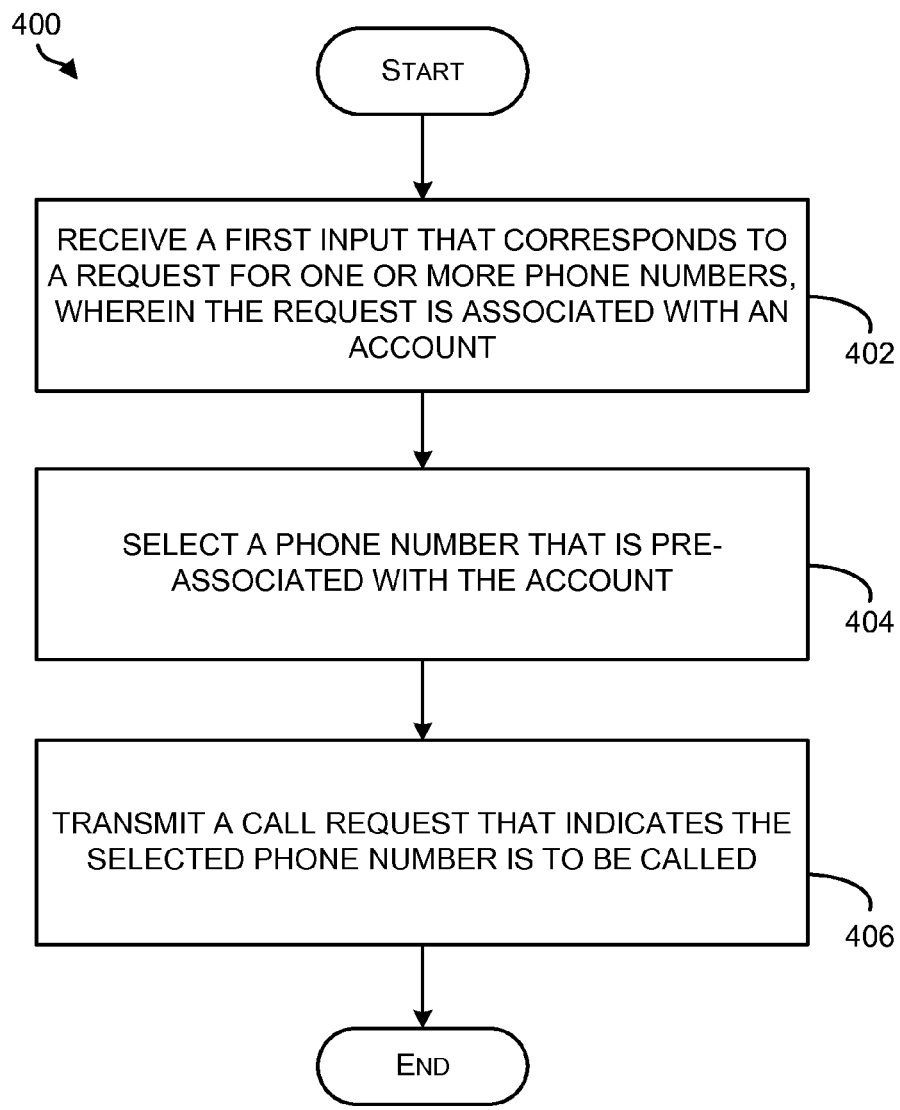
FIG. 4 is a flow diagram that depicts functions that may be included in the communication system to facilitate implementation of the methods described herein.

FIG. 4 is a flow diagram 400 that depicts functions that may be included in or performed by the communication system to facilitate implementation of the methods described herein. The methods may be used with communication system 100, and may be performed by a device or components of one or more devices.

For purposes of illustration, the method in FIG. 4 is described as being implemented by a computing device (such as set-top box 106 in FIG. 1 or computing device 200 in FIG. 2), however, other examples are also possible. The computing device may be configured to receive one or more media signals. The media signals may include video, audio, or television signals. For example, the media signals may comprise information including a sequence of television signals. The computing device may demodulate and decode the information to obtain the sequence of television signals. Though described as a sequence of television signals, it should be understood that any number of television signals may be received, such as a single television signal or a plurality of television signals.

The method in FIG. 4 is described in the context of a customer interacting with a software application (such as application 222 in FIG. 2) at the computing device. The application may be installed at the computing device and executable to provide outputs in the form of one or more media signals that are displayable to the customer via a display device (such as display device 252 in FIG. 2). If the application is not installed at the computing device, the computing device may request the application from a server (such as message handler server 114 in FIG. 1). The server may send all or part of the application to the computing device over a network (such as network 112 in FIG. 1). The server may also send application updates or modifications to the computing device via the network. In some instances, the computing device may request the application from the server in response to a customer request to use the application.

For example, a customer may request to interact with a "call me" application, which allows the customer to request that a CSR call the customer at a specified phone number. The computing device may request the application from the server, and store the application in memory (such as memory 212 in FIG. 2). The computing device may execute program logic of the application to output an initial media signal that may be displayed to the customer as an introduction display for the application. The introduction display may include a login screen, a welcome screen, one or more menu options, one or more locations for selecting or entering an input, etc. For example, the introduction display may provide the customer with the ability to select or enter an input that indicates that the customer is interested in receiving a call from a CSR. The input may include a phone number for a CSR to use to contact the customer. In some examples, the input may correspond to a request for one or more phone numbers associated with a customer account. In yet further examples, the input may also include customer account information, such as a subscriber ID, subscriber location, subscriber language, or subscription level. The customer account information may be entered by the customer, or associated with the input at the computing device. The selected or entered data may be indicative of a first input.

The computing device may receive the first input at block 402. As described, the first input may correspond to a request for one or more phone numbers, wherein the request may be associated with a customer account. Once received, the first input may trigger the computing device to execute program logic associated with a call request that causes the computing device to output a first media signal, such as a video, audio, or television signal, to a display device. The first media signal can be output after the initial media signal is output.

The first media signal may be displayable to present a variety of data including the requested one or more phone numbers. The displayed phone numbers may include one or more of the phone numbers (such as phone numbers 224 in FIG. 2) stored at the computing device. In some examples, the computing device may obtain the phone numbers by transmitting to a server (such as billing system server 116 in FIG. 1) a request for phone number data pre-associated with account data such as a subscriber ID. The server may respond to the request by determining one or more phone numbers associated with a subscriber ID and sending all or a subset of the one or more phone numbers to the computing device. The one or more phone numbers may, for example, be pre-associated with the customer account using a database. In some examples, a single phone number may be pre-associated with the customer account. In other examples, however, two or more phone numbers may be pre-associated with the customer account.

Once the phone numbers are displayed to the customer, the customer may select one of the displayed phone numbers or enter a new phone number. The selected phone number may be received at the computing device. At block 404, the computing device may select a phone number that is pre-associated with the customer account. After a phone number is selected, the computing device may transmit a second media signal displayable to present a confirmation display to the customer. The confirmation display may include a confirmation of the phone number that was selected by the customer, a mechanism for the customer to confirm that the selected phone number is the number that the CSR or call placement system server 120 should call, etc.

In some implementations, the customer may also be asked to enter additional data or inputs that may help the CSR assist the customer. The additional data may relate to questions or comments that the customer may have regarding program information, connectivity issues, billing information, services, etc. For example, the customer may have a question about a pay-per-view program, a current or past bill, how to add additional channels, how to fix an improperly functioning remote control, why a set-top box is losing a signal or has an intermittent signal, what a certain error may indicate, etc. The additional data may be entered at the confirmation display, or at a display occurring before or after the confirmation display. In another example, the customer may input a scheduled date or time for the CSR to call the customer at the identified phone number. The computing device can output one or more additional media signals displayable to present displays for selecting or otherwise entering the additional data or schedule data. Other examples also exist.

The computing device may receive a third input identifying the phone number and confirming that the computing device should transmit the call request for the CSR to call the identified phone number. In response to the third input, the computing device may, at block 406, transmit a call request to a server (such as a customer service center server 118) that indicates the selected phone number is to be called. In some implementations, the computing device may format the call request logic in response to the third input prior to transmitting the call request.

The computing device may notify the customer that the call request was transmitted. The notification may be performed by the computing device transmitting a third media signal displayable to indicate that the call request was transmitted. In some examples, the third media signal may include additional data indicating an estimated or actual amount of time before the CSR is scheduled to contact the customer, an ID associated with the call request, etc.

Once the server receives the call request, the server may process or forward the call request to one or more servers. For example, the server may be a first server that sends the call request to a second server (such as a customer service center server 118) to queue the call request. Once through the queue, the second server may directly or indirectly notify a third server (such as call placement system server 120) that a CSR is available to call the customer at the identified phone number. The third server may aid in connecting the CSR to the customer at the identified phone number. The customer may receive the incoming call and be given an option to accept or decline the call. For instance, the customer may decline the incoming call by not answering the call. In another instance, the customer may pick up the call and be provided with an opportunity to decline being connected to the CSR at that time. If the customer answers and accepts the call, the CSR and customer can be connected.

In some implementations, the customer may be given the option of rescheduling the call for a different phone number, a different date or time, etc. For example, the customer may pick up the call, decline being connected to the CSR, and instead request to reschedule the call request to another time. In another example, the customer may interact with the software application to reschedule the time of the call request from the originally scheduled time to a new time. In such examples, the rescheduled time request data may be received by the computing device as a fourth input that causes the call request logic to identify the reschedule time request that indicates a reschedule call time for the call to the identified phone number. The computing device may transmit the rescheduled time request in a similar manner to that described above.

While method 400 is described in terms of a CSR calling the customer, it should be understood that other communication mechanisms are also possible. For example, the method 400 may allow the CSR to communicate with a customer via short message service (SMS), instant message (IM), email, a video call, etc.

Figure 5:
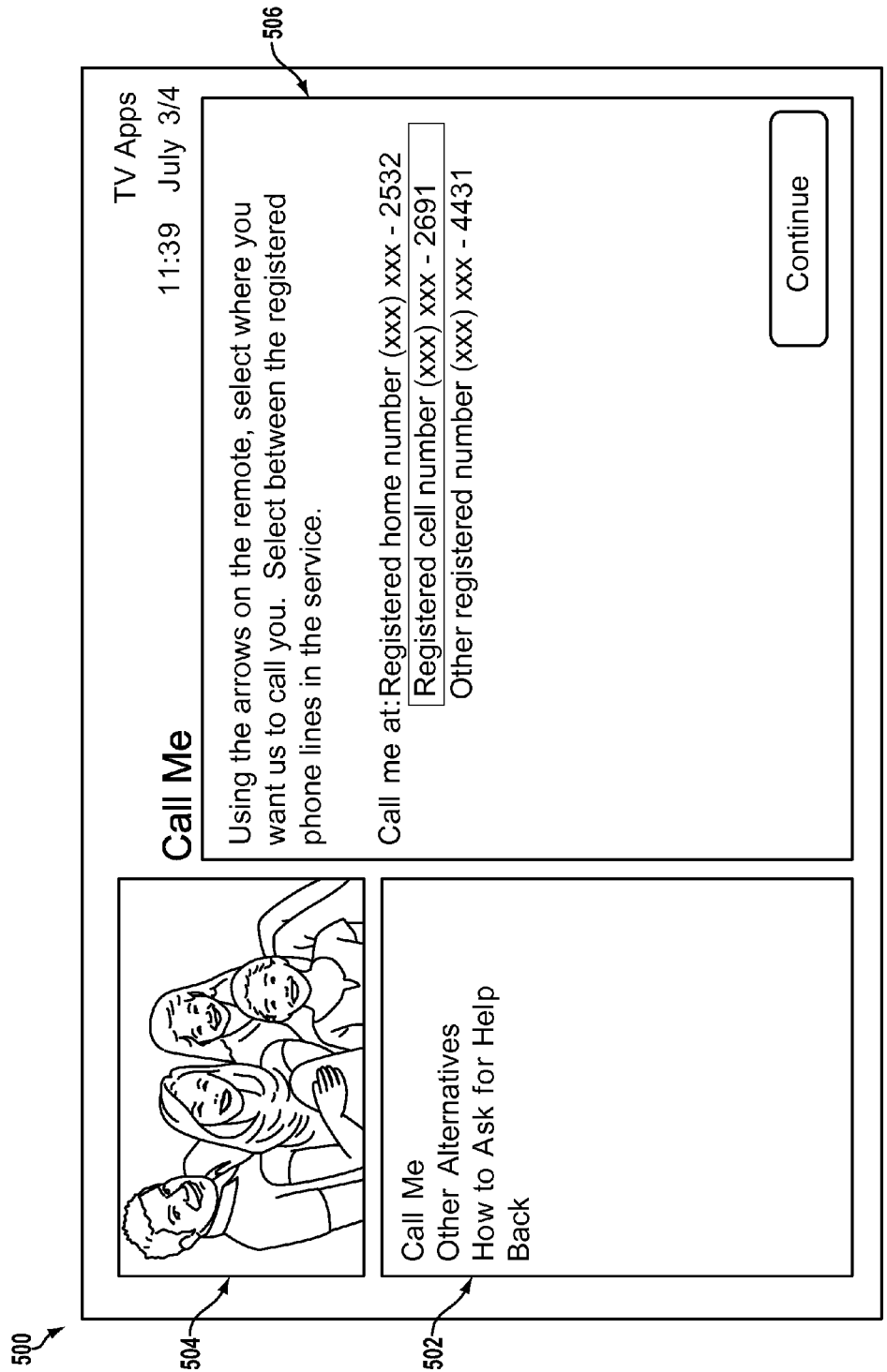
FIG. 5 is a pictorial diagram that illustrates a user interface view for interacting with an application.
Figure 6:
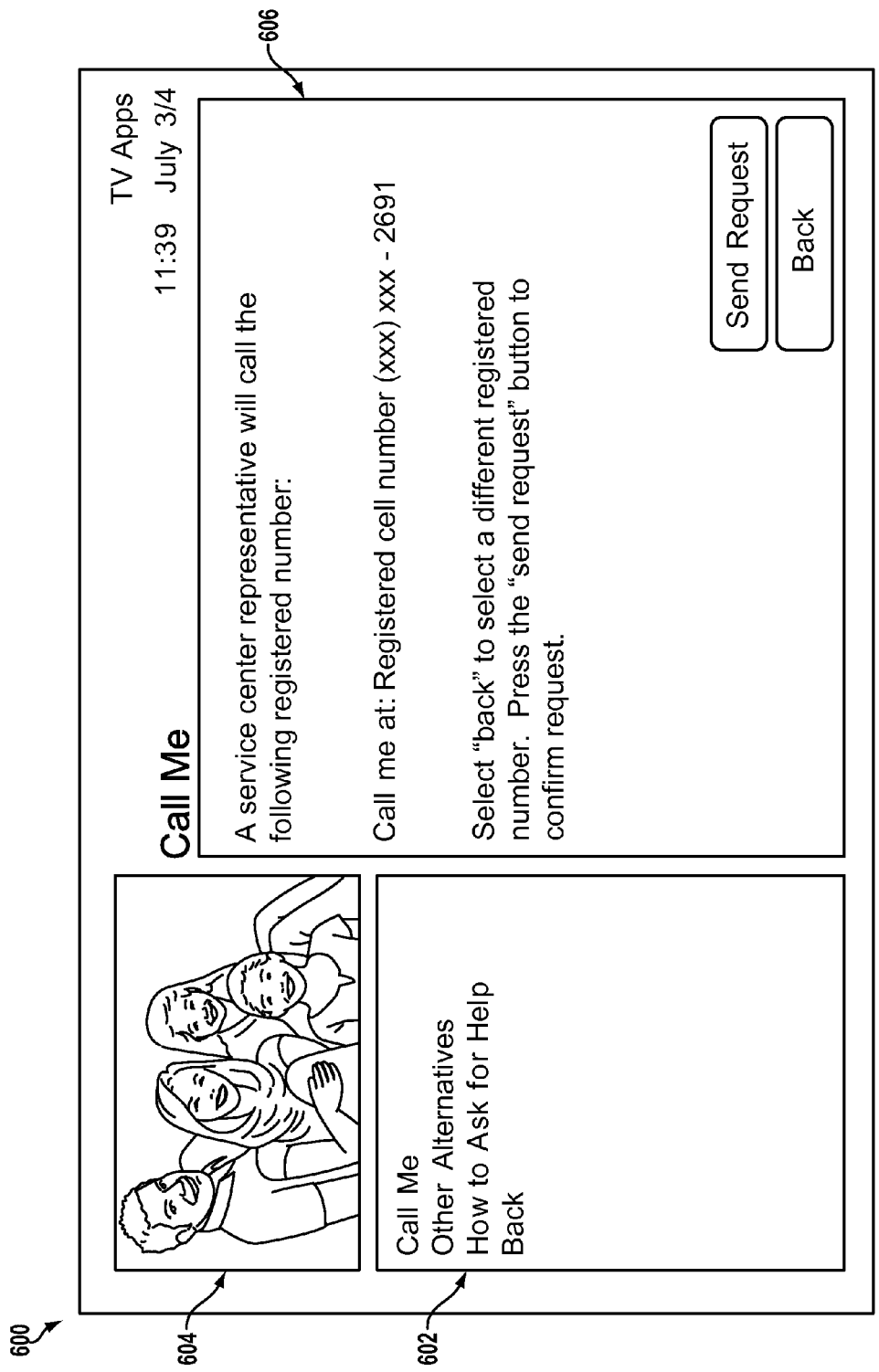
FIG. 6 is a pictorial diagram that illustrates a user interface view for requesting a call from a CSR.
Figure 7:
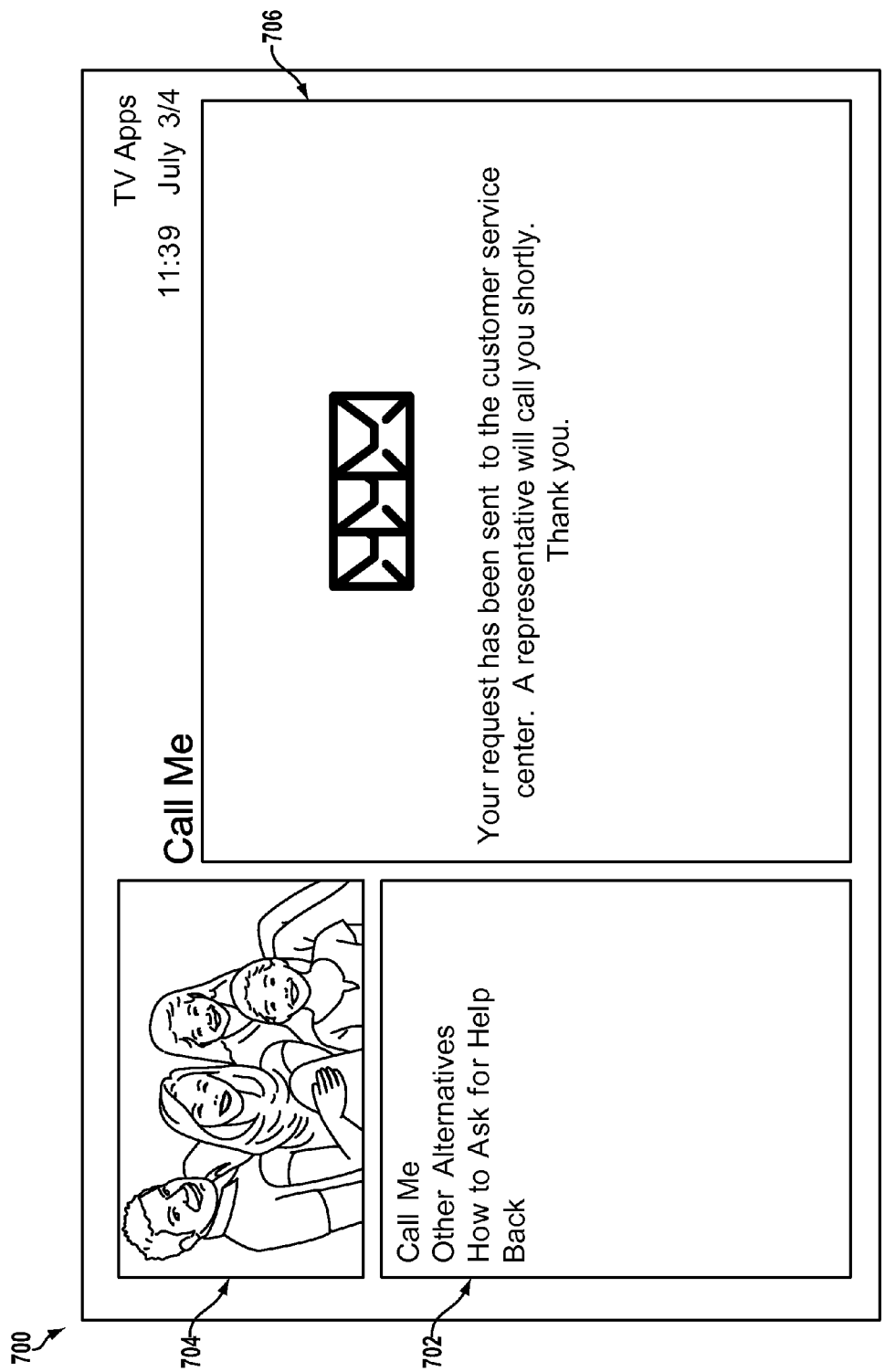
FIG. 7 is a pictorial diagram that illustrates a user interface view for identifying when a customer is scheduled to receive a call from a CSR.

FIGS. 5-7 are pictorial diagrams illustrating example user interface views transmitted within a media signal to display device 252 by output driver 250. Each user interface view can include a portion for displaying a media signal (from decoder 208), a menu portion, etc. The media signal may include a video signal, audio signal, or a television signal.

FIG. 5 is a pictorial diagram that illustrates a user interface view 500 of data associated with an application in accordance with embodiments described herein. As illustrated, user interface view 500 includes a menu 502, a first display portion 504 generated from a television signal, and a second display portion 506 generated from a media signal. The television signal for generating the first display portion can be included within or separate from the media signal used to generate the second display portion.

The menu 502, first display portion 504, or second display portion 506 may be static or dynamic (e.g., changing). For example, The menu 502 and second display portion 506 can be dynamic in that movement of an indicator, such as a pointer, can highlight or otherwise identify selectable inputs. In another example, the first display portion 504 can be a dynamic television signal or a static television signal (e.g., if the first display portion 504 is stopped or paused). If the television signal received for first portion 504 is not paused or stopped, first portion 504 can show a changing television program while menu 502 and second portion 506 can be static if no selection is made. A dynamic first display portion 504 may allow the customer to continue to watch a television program that the customer may have been watching prior to requesting the application by continuing to display signals received or otherwise stored and output by the computing device. In some instances, the customer may also change the channel (tune to another channel) while the "call me" application is displayed to the customer.

A customer may interact with menu 502, first display portion 504, or second display portion 506, to input or receive data. For example, a customer may select the software application "call me" in menu 502. Once selected, the "call me" application may be launched and the customer may be presented with a first media signal displayable to present one or more phone numbers, including a "registered home number," "registered cell number," and "other registered number(s)." The customer may select one of the phone numbers for the CSR to use to contact the customer. After selecting one of the phone numbers, the customer may select "continue" to proceed to another interactive view or display.

FIG. 6 is a pictorial diagram that illustrates a user interface view 600 for requesting a call from a CSR in accordance with embodiments described herein. Like FIG. 5, FIG. 6 may also include a menu 602, a first display portion 604, and a second display portion 606, which may correspond to respective menu 502, first display portion 504, or second display portion 506. As illustrated, user interface view 600 includes a second media signal displayable to present a confirmation display that allows a customer to select whether the phone number that was selected in a prior interaction (such as the interaction illustrated in FIG. 5) is the phone number that the customer would like the CSR to call. If so, the customer may select "send request" to request that a CSR call the customer at the selected phone number. If the customer wants to select or enter a different phone number, the user may select "back" to return to a prior interface view (such as user interface view 500).

FIG. 7 is a pictorial diagram that illustrates a user interface view 700 for identifying when a customer is scheduled to receive a call from a CSR in accordance with embodiments described. FIG. 7 may include a menu 702, a first display portion 704, and a second display portion 706, which may correspond to one or more of respective menus 502 or 602, first display portions 504 or 604, or second display portions 506 or 606 illustrated in FIGS. 4 and 5. As illustrated, user interface view 700 includes a third media signal displayable to provide a customer with an indication that a call request has been transmitted, and the time that the customer should receive a call at the selected phone number.

V. Back End Methods and Examples

Figure 8:
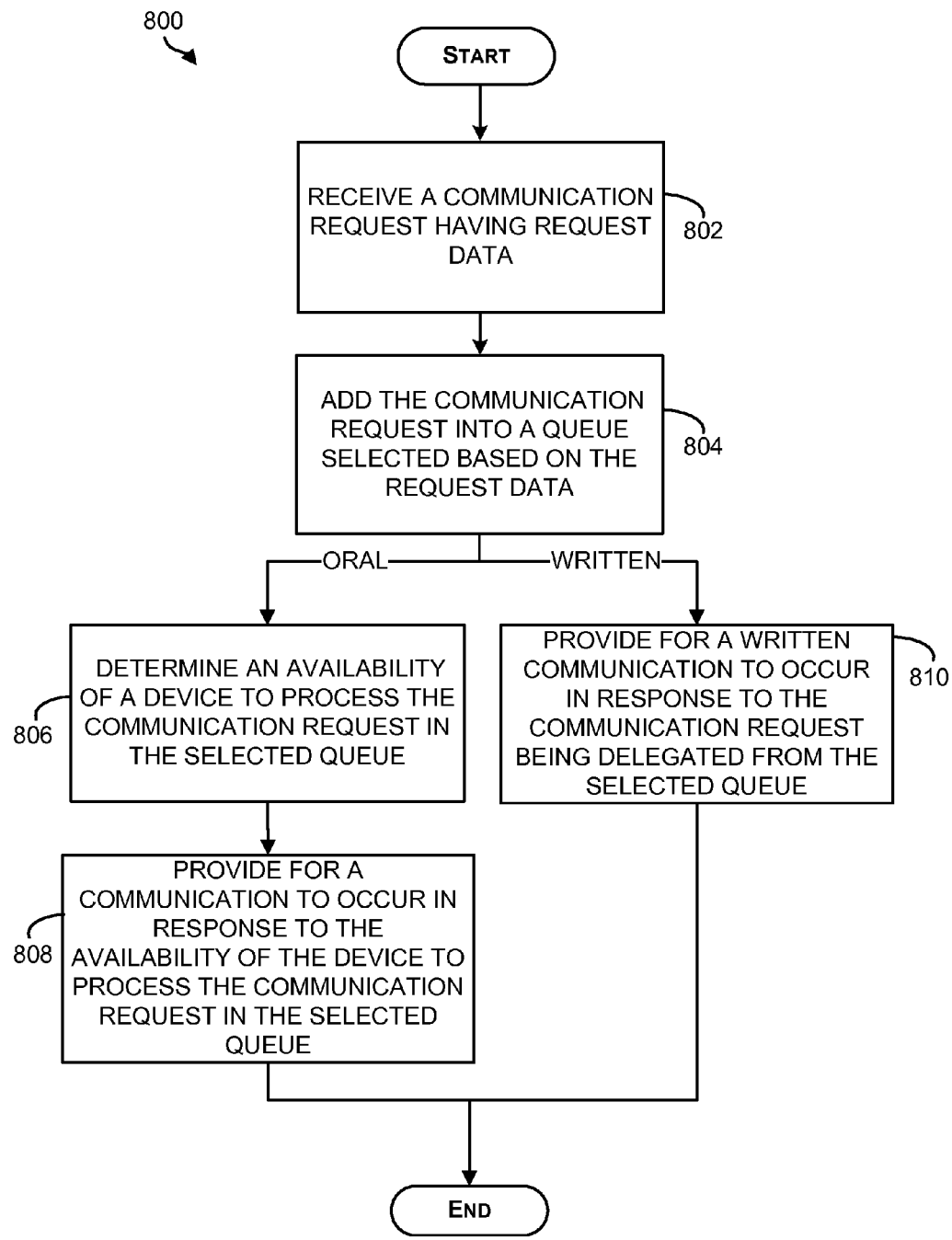
FIG. 8 is a flow diagram that depicts functions that may be included in the communication system to facilitate implementation of the methods described herein.

FIG. 8 is a flow diagram that depicts a method 800 that may facilitate CSR communication requests. In particular, method 800 may be implemented by a television service provider's server system in order to route CSR communication requests to appropriate CSR systems so that the CSRs can respond. Method 800 may be implemented, for example, by one or more devices or components of communication system 100, or by other devices, systems, or combinations thereof.

For purposes of illustration, method 800 is described as being implemented by a server (such as server 300 in FIG. 3). In some examples, the server may include one or more distributed servers configured to implement the methods described herein (such as message handler server 114, billing system server 116, customer service center server 118, and call placement system server 120 in FIG. 1). It should be understood, however, that other devices, systems, or combinations of devices and/or systems may also implement method 800 or portions thereof.

A. Receiving a Communication Request

At block 802, method 800 may include receiving a communication request having request data. The communication request may be initiated by a computing device configured to communicate data to a server. For instance, the computing device may include a set-top box (such as set-top box 106 in FIG. 1) that is configured to demodulate and decode television signals. In another instance, the computing device may include a user device (such as user device 110 in FIG. 1). Other examples of computing devices that can initiate the communication request are also possible.

The communication request may include request data. The request data may include customer information (such as the customer account information described in reference to billing system server 116 in FIG. 1). For instance, the request data may include a subscriber identifier for identifying a customer or a set-top box associated with the communication request. The request data may also include an indicator of whether an oral communication (e.g., a phone call or video conference) or written communication (e.g., an email, a short message service, chat, or an instant message) should be used to respond to the communication request. In another instance, the request data may include an e-mail address or a number, such as a phone number or Internet Protocol address, for receiving the oral or written communication. In yet another instance, the request data may include a language identifier, which may identify a language that can or should be used to orally or textually communicate with a customer. Examples of language identifiers may include the name of a language (such as German, Spanish, Italian, etc.) or a representation of the language that may be used to identify the language via a database lookup.

In yet a further instance, the request data may include a service area identifier. The service area identifier may be indicative of a geographical region where a service is available. The geographical region may include one or more towns, cities, districts, states, territories, provinces, states, countries, etc. In some examples, the geographic region may include a subset of one or more regions, such as a subset of a first city and all or a subset of a second city. In another example, the geographic region may be based on cultural or political regions, such as a region where the customers speak the same language or watch the same programs. Other examples are also possible.

Routing and Queuing a Communication Request

At block 804, the method may include adding the communication request into a queue selected based on the request data. The process of adding the communication request into a queue may include the server using all or part of the request data to identify one or more candidate queues. The candidate queues may include one or more queues, priority queues, bonded queues, double-ended queues, or other data structures that are configured to receive communication requests associated with request data. For purposes of illustration, example candidate queues are provided in Table 1.

TABLE 1

| Queue | CSR Number | Country | Service Level | Availability |
|---|---|---|---|---|
| 1 | 1 | UY | 1, 2, 3 | AVAIL |
| 2 | 2 | AR | 1 | UNAV |
| 3 | 3 | US | 2, 3 | AVAIL |
| 4 | 4 | BR | 1, 2 | AVAIL |
| 4 | 5 | BR | 1 | UNAV |
| 4 | 6 | BR | 1, 3 | UNAV |
| 5 | 7 | BR | 2 | AVAIL |
| 2 | 8 | AR | 1, 2, 3 | AVAIL |
| 3 | 9 | US | 3 | AVAIL |

As illustrated, Table 1 includes five example candidate queues. The candidate queues may be located on a single server or distributed over more than one server. As shown, in some implementations, two or more CSRs may be assigned to a single queue (e.g., CSR Numbers 4, 5, and 6 are associated with Queue 4 in Table 1). As further shown, CSRs may be assigned their own queue, which is not shared with any other CSRs (e.g., CSR Number 1 is uniquely associated with Queue 1 in Table 1). In other implementations, each queue may be assigned to only one CSR. In yet other implementations, each and every queue may have multiple CSRs assigned thereto.

For purposes of routing and queuing CSR call requests, individual CSRs may be uniquely identified in a number of ways, such as by unique CSR numbers or identifiers. Further, a CSR number or identifier for a given CSR may be associated with one or more characteristics or attributes, which may be indicative of the types of call requests for which the given CSR is trained or otherwise qualified to respond. These characteristics or attributes may be associated with all or a subset of the request data. For example, a CSR may be associated with a service-level indicator, which indicates the amount or level of training that the CSR has received. A CSR may also be associated with a language indicator or a country indicator, which may indicate language(s) or location(s) in which the CSR is capable or available to respond. The CSR may further be associated with an availability identifier, which may indicate a current availability of the CSR to respond to a communication request. Other characteristics or attributes may additionally or alternatively be associated with a particular CSR number or identifier.

To illustrate a specific application of block 804, consider the scenario where a server receives a communication request that indicates a subscriber ID and a subscriber phone number. The server may use one or more database lookups to identify a subscription level associated with the subscriber ID and a country associated with the subscriber phone number. Based at least in part on the request data, the server may identify one or more candidate queues having CSRs that are qualified to assist a customer from the identified country and trained to assist a customer with the identified subscription level. The server may then select one of the candidate queues in which to route the communication request.

The process of selecting a queue in which to place the communication request may take a variety of forms. For example, the selection process may be based on one or more matching functions. The matching functions may utilize all or part of the request data to match the communication request to one or more candidate queues. The determination of how good of a match a candidate queue is may be based on a goodness of fit determination, a comparison to a threshold level, or any number of alternative mechanisms. For example, a matching function may receive request data indicating that a communication request is from a customer from a specific country, who speaks a specific language, and has a question about pay-per-view programming. The matching function may compare this data to data associated with one or more queues to determine if a CSR receiving communication requests from a queue is qualified to assist the customer with regard to each piece of request data. If no CSR is a perfect match, or such a CSR is not available to assist the customer at a requested time, the matching function may determine a next best alternative (such as a CSR that matches all but one or two of the request data). This process may continue until the matching function identifies a qualified CSR to assist the customer.

In some instances, the matching function may assign a weight to one or more of the request data that may indicate an importance of the data or if the data must or should be matched. The weight may be used to assist in determining what request data to match first, how to differentiate between one or more candidate queues, etc. For example, if a customer only speaks one language, it may be important that the CSR that assists the customer speak the customer's language. In such examples, a higher weight may be associated with the customer's language than, for example, the customer's zip code.

As another example, in reference to Table 1, a communication request having request data indicative of a call request from Brazil for a customer with a service level of 1 may be placed into queue 4 based on a goodness of fit with CSRs associated with queue 4. In another instance, the request data may indicate that a customer would like a CSR to contact the customer at a specified time. The server may thereafter identify a queue having one or more qualified CSRs available to contact the customer at the specified time. This process may include use of a priority queue, wherein the communication request is placed in the priority queue based on the requested time. If a customer wants to speak with a CSR right away, the customer may be placed in a queue having a large number of available CSRs, placed in a double-ended queue, or placed in a variety of other queues for quick processing. In some examples, the communication request may be the only request in the queue.

In yet another instance, a communication request may include request data indicating that the customer would like a written response. In response, the server may utilize a matching function to identify one or more queues having CSRs that are available to provide the requested type of written response. The queues used to provide written or oral communications may be the same queues or separate queues. Once a queue is selected, the server may route the communication request to be placed in the selected queue.

For example, a customer may have difficulties troubleshooting a set-top box network connection speed. The customer may identify this difficulty and include the difficulty in the communication request. Alternatively, the set-top box or other computing device may identify the issue based on, for example, a customer action, an error code, one or more diagnostics performed by the set-top box, a previous customer request, one or more problems that may have occurred in the customer location or with the same device, etc. The matching function may identify one or more candidate queues associated with CSRs that have experience in diagnosing or fixing network issues. Of the candidate queues, the matching function may identify that a subset of the queues are associated with CSRs having experience with network connection speeds. If all queues in the subset of queues include CSRs that can assist the customer, the server may use other factors (such as the speed or length of the queue) to determine where to add the communication request. A CSR may thereafter receive and respond to the customer request by sending a written communication that includes the requested instruction manual.

When the request data includes a request for an oral communication, method 800 may proceed, at block 806, to determine an availability of a device to process the communication request in the selected queue. The availability may be determined by identifying whether a CSR is currently engaged in a call, an estimated amount of time the CSR has been engaged in the call, whether the CSR is on a break, how many communication requests are in a CSR's queue, etc. This availability data may be tracked by a device being used by the CSR or a call center. For example, a CSR may use a computing device configured to monitor the CSR's availability and provide the CSR with request data to aid in responding to communication requests. In another example, the CSR may use a telephone that indicates whether the CSR is available based on whether the telephone is connected to a call. In yet another example, the call center may include software for determining the availability of one or more CSRs within the call center. Other examples are also possible.

The server may provide a notification indicating that the communication request is pending in the selected queue. The notification may be presented to a CSR via a device, such as a computing device. If the CSR is available for a call, the CSR may respond to the notification by using the device to select a communication request from the queue. The device may transmit the selection and the availability of the device to the server for processing.

At block 808, method 800 includes providing for a communication to occur in response to the availability of the device to process the communication request in the selected queue. The process of providing for the communication may include the server adding a communication from the CSR's device to a customer's device based on the request data. For example, a CSR may use a device to call the customer's phone at a requested phone number. The customer may respond to the phone call by using the customer's phone to accept or reject the call. A customer accepting or otherwise approving a call may result in the customer's device sending a signal receivable by the server that indicates approval to connect the customer's device to the CSR's device. Once the call is approved, the server may connect the customer's device to the CSR's device. The communication may continue until the customer or the CSR ends the call.

Should the customer request a written communication instead of an oral communication, method 800 may proceed to block 810 instead of block 806. At block 810, method 800 may include providing for a written communication to occur in response to the communication request being delegated from the selected queue. The written communication may include text, letters, words, marks, images, etc. that can be communicated from a CSR's device to a customer's device. For example, the written communication may include instructions or screen shots on how to fix a problem. In another example, the written communication may include one or more attachments, which may include verbal recordings, that may assist the customer. Other examples also exist.

Written communications may be queued based on request data, as described in reference to blocks 802 and 804. The request data may indicate whether a specific type of written communication (e.g., email, short message service, or instant message) is requested. The request data may also include what, if any, priority is associated with the communication request. For example, a communication request may have a low, medium, or high priority. In another example, the customer may request a response to the communication request within a specific time or in a specific language. The server may select what queue to place the communication request based on the type of written communication requested or the priority of the communication request. Once placed in a queue, the communication request may be delegated to a CSR who is tasked with responding to the communication request. In some examples, the CSR and the customer may engage in multiple communications related to the communication request. Subsequent communications may be placed in a queue associated with the same or a similarly trained CSR. Placement within the queue may include adding the subsequent communication at the end of the queue or adding the subsequent communication at a position that is higher than one or more new communications. Other examples are also possible.

While method 800 describes request data as including a request for an oral or written communication, it should be understood that the request data may include a request for both an oral and a written communication. For example, a customer may request both a written communication (such as an instruction manual) and an oral communication from a CSR who can provide additional assistance to the customer. When both an oral and written communication are requested, method 800 may include steps 806, 808, or 810. In some examples, method 800 may include an additional step of separating the oral communication and written communication into two or more communication requests, and processing the communication requests separately as oral or written communications as described in method 800.

Figure 9:
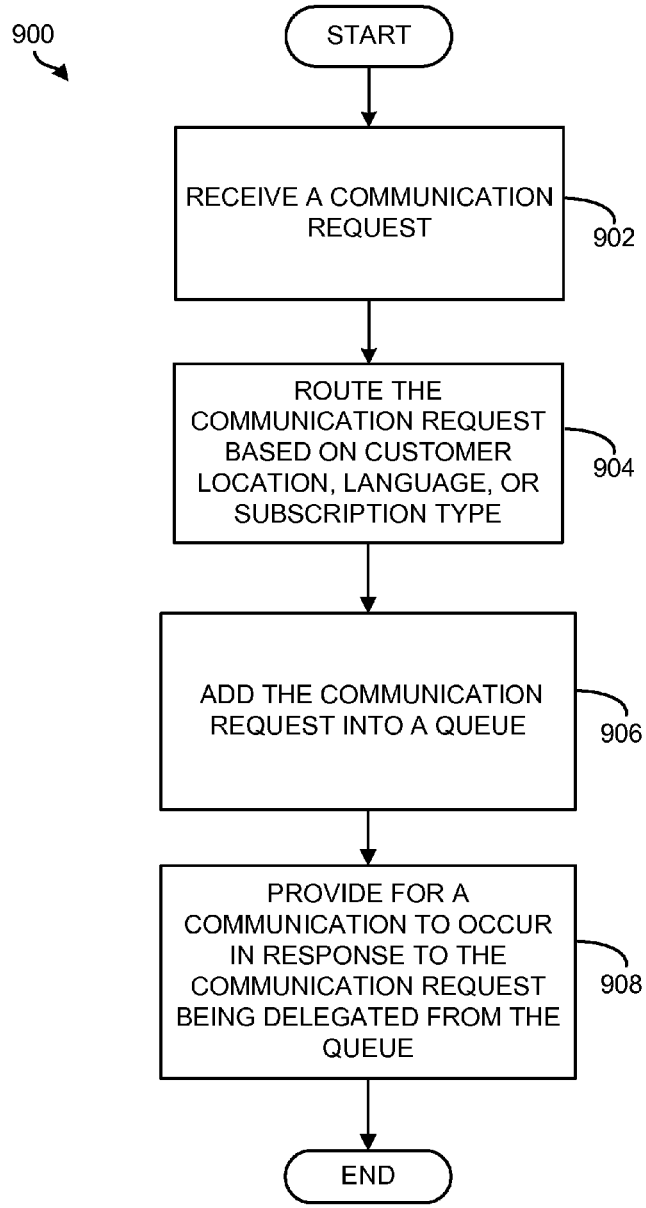
FIG. 9 is another flow diagram that depicts functions that may be included in the communication system to facilitate implementation of the methods described herein.

FIG. 9 is a flow diagram that depicts a method 900 that may facilitate CSR communication requests. In particular, method 900 is a more detailed embodiment of features in method 800. Like method 800, method 900 may include, at block 902, receiving a communication request. The communication request may include request data that includes, for example, a customer location, language, or subscription type. At block 904, method 900 may include routing the communication request to one or more queues based on the customer location, language, or subscription type. The process of routing the communication request may include the use of one or more matching functions to identify one or more candidate queues or to select a queue. At block 906, method 900 may include adding the communication request into a queue, such as the queue that was identified or otherwise selected by the server. After the communication request is added into a queue, method 900 may include, at block 908, providing for communication to occur in response to the communication request being delegated from the queue. The communication may include a written or oral communication from a CSR to a customer.

VI. Conclusion

While the methods described herein illustrate a number of blocks that are in a sequential order, these blocks may also be performed in parallel or in a different order than those described herein. Also, the various blocks may be combined into fewer blocks, or divided into additional blocks. In addition, it should be understood that the flow diagrams show functionality and operation of possible implementations of the present embodiments, though other implementations are also possible. Moreover, each block in the flow diagrams may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a set-top box computing device, information including a sequence of television signals;
   demodulating and decoding, by the computing device, the information including the sequence of television signals to obtain the sequence of television signals;
   outputting, by the computing device, a first media signal displayable to present the sequence of television signals;
   receiving, at the computing device, a first input that corresponds to a request for one or more phone numbers, wherein the request is associated with an account;
   outputting, by the computing device, a second media signal displayable to present the one or more phone numbers simultaneously with the sequence of television signals;
   in response to receiving the first input, the computing device selecting a phone number that is pre-associated with the account; and
   transmitting a call request from the computing device, wherein the call request indicates the selected phone number is to be called.

2. The method of claim 1, further comprising:
   the computing device identifying two or more phone numbers that are pre-associated with the account;
   the computing device outputting the second media signal displayable to present the two or more pre-associated phone numbers simultaneously with the sequence of television signals; and
   receiving, at the computing device, a second input identifying one of the two or more pre-associated phone numbers from the one or more phone numbers, wherein the call request indicates the identified phone number.

3. The method of claim 2, further comprising:
   outputting, by the computing device in response to receiving the second input, a third media signal displayable to present a confirmation display.

4. The method of claim 2, further comprises:
   receiving, at the computing device, a third input that indicates a confirmation for the computing device to transmit the call request.

5. The method of claim 4, further comprising:
   formatting, by the computing device, the call request in response to receiving the third input.

6. The method of claim 4, wherein the third input indicates a schedule call time for the call to the identified phone number.

7. The method of claim 6, further comprising:
   receiving, at the computing device, a fourth input that identifies a reschedule time request that indicates a reschedule call time for the call to the identified phone number, wherein the reschedule call time differs from the schedule call time.

8. The method of claim 1, wherein receiving the first input further causes the computing device to transmit a request for the one or more phone numbers and receive the one or more phone numbers.

9. The method of claim 1, wherein the call request includes subscriber data associated with the one or more phone numbers, and wherein the subscriber data includes a subscription level and one or more of a subscriber identifier, a subscriber location, and a subscriber language.

10. The method of claim 1, further comprising:
    outputting, by the computing device, a third media signal displayable to indicate transmission of the call request.

11. The method of claim 1, further comprising:
    receiving, by a server, the call request having call-request data;
    identifying, by the server using the call-request data, a subscription level associated with the call request, wherein the subscription level indicates what type of television plan is associated with the account;
    placing, by the server, the call request into a queue selected from among a plurality of queues based on the subscription level;
    determining, by the server, an availability of another computing device to process the call request in the selected queue; and
    providing, by the server, for a call to occur in response to the availability of the other computing device to process the call request in the selected queue.

12. A computing device comprising:
    a processor;
    data storage; and
    program instructions stored in data storage and executable by the processor for carrying out a set of functions, wherein the set of functions includes:
    receiving information including a sequence of television signals;
    demodulating and decoding the information including the sequence of television signals to obtain the sequence of television signals;
    outputting a first media signal displayable to present the sequence of television signals;
    receiving a first input that corresponds to a request for one or more phone numbers, wherein the request is associated with an account;
    outputting a second media signal displayable to present the one or more phone numbers simultaneously with the sequence of television signals;
    in response to receiving the first input, the computing device selecting a phone number that is pre-associated with the account; and
    transmitting a call request from the computing device, wherein the call request indicates the selected phone number is to be called.

13. The computing device of claim 12, wherein the set of functions further includes:
    identifying two or more phone numbers that are pre-associated with the account;

outputting the second signal displayable to present the two or more pre-associated phone numbers simultaneously with the sequence of television signals; and receiving a second input identifying one of the two or more pre-associated phone numbers from the one or more phone numbers, wherein the call request indicates the identified phone number.

14. The computing device of claim 13, wherein the set of functions further includes:

outputting, in response to receiving the second input, a third media signal displayable to present a confirmation display.

15. The computing device of claim 12, wherein the set of functions further includes:

receiving a third input that indicates a confirmation for the computing device to transmit the call request; and formatting the call request in response to receiving the third input.

16. The computing device of claim 12, wherein the set of functions further includes:

outputting a third media signal displayable to indicate transmission of the call request.

17. A non-transitory computer-readable medium having stored thereon instructions executable by a computing device to cause the computing device to perform functions comprising:

receiving information including a sequence of television signals;

demodulating and decoding the information including the sequence of television signals to obtain the sequence of television signals;

outputting a first media signal displayable to present the sequence of television signals;

receiving a first input that corresponds to a request for one or more phone numbers, wherein the request is associated with an account;

outputting a second media signal displayable to present the one or more phone numbers simultaneously with the sequence of television signals;

in response to receiving the first input, selecting a phone number that is pre-associated with the account; and transmitting a call request, wherein the call request indicates the selected phone number is to be called.

18. A method comprising:

receiving, by a server, a call request having call-request data;

identifying, by the server using the call-request data, a subscription level associated with the call request, wherein the subscription level indicates what type of plan a television customer has purchased;

placing, by the server, the call request into a queue selected from among a plurality of queues based on the subscription level;

determining, by the server, an availability of a device to process the call request in the selected queue; and providing, by the server, for a communication to occur in response to the availability of the device to process the call request in the selected queue.

19. The method of claim 18, further comprising:

selecting, by the server, the queue based on the call-request data, wherein the call-request data comprises at least one of a number for a call, a subscriber identifier, a language identifier, or a service area identifier.

20. The method of claim 19, wherein a service area identified by the service area identifier is a geographical region.

21. The method of claim 18, wherein the communication is a phone call.

22. The method of claim 18, wherein the queue is a priority queue or a double-ended queue.

23. The method of claim 18, wherein the server includes one or more distributed servers.

24. The method of claim 18, further comprising:

providing, by the server, a notification indicating the call request is pending in the selected queue, wherein the notification is presentable to a customer-service representative, and wherein determining the availability of the device to process the call request in the selected queue includes receiving, by the server, a notification indicating the customer-service representative selected the call request from the selected queue.

25. The method of claim 18, wherein the device to process the call request is a first device, and wherein providing for the communication to occur includes:

adding, by the server, a phone call to a second device based on a phone number within the call-request data;

receiving, by the server, a signal from the second device indicating approval to connect the called device to the first device; and connecting, by the server, the first device to the second device.

26. The method of claim 18, wherein the call request was initiated by a set-top box configured to demodulate and decode television signals.

27. A method comprising:

receiving, by a server, a communication request having communication data to request a textual response;

identifying, by the server using the communication data, a subscription level associated with the communication request, wherein the subscription level indicates what type of plan a television customer has purchased;

adding, by the server, the communication request into a queue selected from among a plurality of queues based on the subscription level; and providing, by the server, for a written communication to occur in response to the communication request being delegated from the selected queue.

28. The method of claim 27, wherein the communication data further includes one or more of a subscriber identifier, a subscriber location, and a subscriber language.

29. The method of claim 27, wherein the communication request comprises an email, a short message service, or an instant message.

30. The method of claim 27, further comprising:

providing, by the server, a notification indicating the communication request is pending in the selected queue, wherein the notification is presentable to a customer-service representative.

* * * * *